United States Patent
Shin et al.

(10) Patent No.: US 11,976,688 B2
(45) Date of Patent: May 7, 2024

(54) ADHESIVE AND BEARING INCLUDING THE ADHESIVE

(71) Applicant: SAINT-GOBAIN PERFORMANCE PLASTICS CORPORATION, Solon, OH (US)

(72) Inventors: Dongyeop Shin, Shrewsbury, MA (US); Jing Dong, Shrewsbury, MA (US); Nafih Mekhilef, Shrewsbury, MA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 678 days.

(21) Appl. No.: 16/875,374

(22) Filed: May 15, 2020

(65) Prior Publication Data
US 2020/0362914 A1  Nov. 19, 2020

Related U.S. Application Data

(60) Provisional application No. 62/849,744, filed on May 17, 2019.

(51) Int. Cl.
*F16C 33/02* (2006.01)
*C09J 127/18* (2006.01)

(52) U.S. Cl.
CPC ............ *F16C 33/02* (2013.01); *C09J 127/18* (2013.01); *F16C 2208/32* (2013.01); *F16C 2208/60* (2013.01); *F16C 2208/70* (2013.01); *F16C 2226/40* (2013.01)

(58) Field of Classification Search
CPC .. F16C 33/20; F16C 2208/32; F16C 2208/60; F16C 2208/70; F16C 2226/40; F16C 33/02; C09J 127/12–20
See application file for complete search history.

(56) References Cited

U.S. PATENT DOCUMENTS

| | | | |
|---|---|---|---|
| 5,024,882 A | 6/1991 | Matucha et al. | |
| 5,093,403 A | 3/1992 | Rau et al. | |
| 5,573,846 A * | 11/1996 | Harig | F16C 33/201 |
| | | | 428/323 |
| 6,042,271 A | 3/2000 | Harris et al. | |
| 6,140,410 A | 10/2000 | Kolouch | |

(Continued)

FOREIGN PATENT DOCUMENTS

| | | |
|---|---|---|
| CN | 1037481 A | 11/1989 |
| CN | 107969123 A | 4/2018 |

(Continued)

OTHER PUBLICATIONS

International Search Report and Written Opinion for PCT/US2020/033186, dated Sep. 1, 2020, 11 pages.

*Primary Examiner* — Alan B Waits
(74) *Attorney, Agent, or Firm* — Abel Schillinger, LLP; Ann Palma

(57) ABSTRACT

An adhesive layer can include a polymer blend of a first polymer and a second polymer. In an embodiment, the first polymer can be a modified fluoropolymer. In another embodiment, the second can be a non-fluorinated polymer. In a particular embodiment, the adhesive layer can include greater than 60 wt. % of the first polymer for the total weight of the polymer blend. A bearing can include the adhesive layer disposed over a substrate.

20 Claims, 3 Drawing Sheets

(56) References Cited

U.S. PATENT DOCUMENTS

| | | | |
|---|---|---|---|
| 8,802,602 B2* | 8/2014 | Schmitjes | F16C 33/201 |
| | | | 508/100 |
| 9,803,690 B2* | 10/2017 | Ziegler | B32B 15/085 |
| 10,308,890 B2 | 6/2019 | Karaki et al. | |
| 2010/0080497 A1 | 4/2010 | Jaeger et al. | |
| 2012/0128280 A1 | 5/2012 | Ortiz et al. | |
| 2012/0275731 A1* | 11/2012 | Ziegler | C22C 21/00 |
| | | | 384/129 |
| 2013/0183488 A1 | 7/2013 | Liao et al. | |
| 2014/0010484 A1 | 1/2014 | Schmitjes | |
| 2014/0100144 A1 | 4/2014 | Ziegler et al. | |
| 2017/0089390 A1* | 3/2017 | Dong | C08L 27/12 |
| 2018/0050517 A1 | 2/2018 | Nguyen et al. | |
| 2019/0300762 A1* | 10/2019 | Dong | F16C 33/206 |
| 2020/0362914 A1* | 11/2020 | Shin | F16C 33/201 |

FOREIGN PATENT DOCUMENTS

| | | |
|---|---|---|
| CN | 108644233 A | 10/2018 |
| WO | 2015016323 A1 | 2/2015 |
| WO | 2015044458 A1 | 4/2015 |
| WO | 2016181674 A1 | 11/2016 |

* cited by examiner

ADHESIVE AND BEARING INCLUDING THE ADHESIVE

CROSS-REFERENCE TO RELATED APPLICATION(S)

This application claims priority under 35 U.S.C. § 119(e) to U.S. Patent Application No. 62/849,744 entitled "ADHESIVE AND BEARING INCLUDING THE ADHESIVE", by Dongyeop SHIN et al., filed May 17, 2019, which is assigned to the current assignee hereof and incorporated herein by reference in its entirety.

FIELD OF THE DISCLOSURE

The present disclosure relates to an adhesive layer and a bearing including the adhesive layer.

BACKGROUND

Some adhesives can be used in bearing production. For example, adhesive layers may be used to bond a polymer layer and a metal support, which requires sufficient adhesion strength of the adhesives to both materials to avoid failure of bonding. The industry continues to demand improved adhesives for manufacture of bearings.

BRIEF DESCRIPTION OF THE DRAWINGS

Embodiments are illustrated by way of example and are not limited in the accompanying figures.

Figure 1:
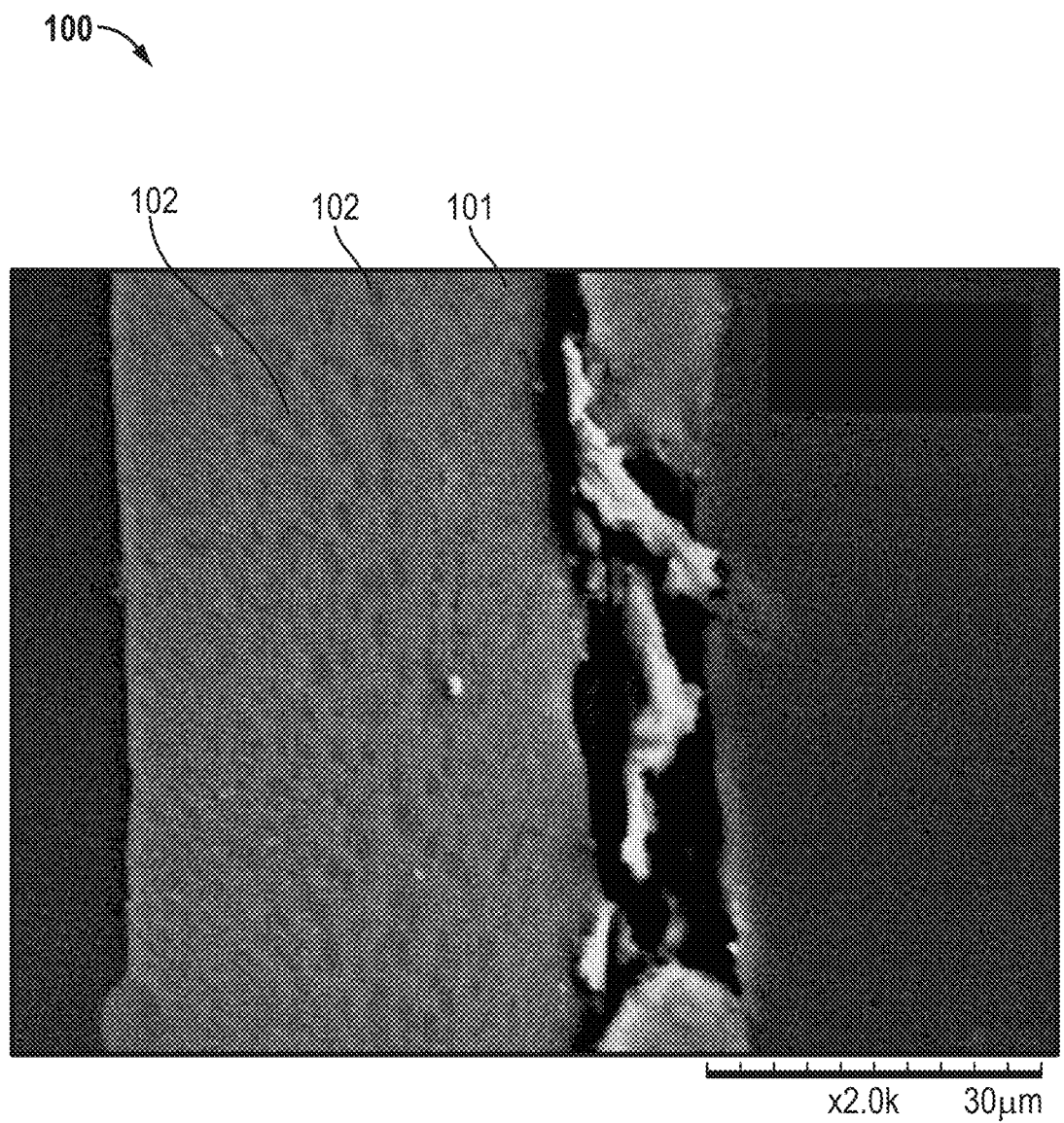
FIG. 1 includes a scanning electron microscopic image of an exemplary polymer blend.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the arts this disclosure belongs to.

Embodiments disclosed herein relate to an adhesive layer. The adhesive layer can include a polymer blend of a first polymer and a second polymer that is different from the first polymer. The adhesive layer can have improved properties including mechanical strength, such as increased peel strength, elongation at break, or both.

Further embodiments can be drawn to a bearing including the adhesive layer disposed over a substrate. The bearing can further include a sliding layer disposed over the adhesive layer. The bearing can have improved service life.

In an embodiment, the adhesive layer can include a polymer blend of a first polymer and a second polymer, wherein the first polymer is a fluoropolymer. In an aspect, the first polymer can be a modified fluoropolymer. In a particular aspect, the modified fluoropolymer can include a functional group, such as a hydroxyl group (—OH), a carbonyl fluoride (—COF), a carboxyl group (—COOH), an anhydride group, an acrylate group (—CH$_2$=CHCOOH), a glycidyl methacrylate group (—CH$_2$C(CH$_3$)COOCH$_2$(CHCH$_2$O)), or a combination thereof. In another particular aspect, the modified fluoropolymer can include modified ethylene tetrafluoroethylene (hereinafter referred to as ETFE), modified perfluoroalkoxyethylene (mPFA), modified tetrafluoro-ethylene-perfluoro(methyl vinyl either) (mMFA), modified ethylene chlorotrifluoroethylene copolymer (mECTFE), modified tetrafluoroethylene-hexafluoropropylene (mFEP), modified polyvinylidene fluoride (mPVDF), or any combination thereof. In a more particular aspect, the first polymer can consist essentially of modified ETFE. In an even more particular aspect, the modified ethylene tetrafluoroethylene (mETFE) can include a functional group including an anhydride group.

In an embodiment, the adhesive layer can include a certain content of the first polymer that can facilitate improved performance and property of the adhesive layer. In an aspect, the content of the first polymer can be at least 5 wt. % for the total weight of the polymer blend, such as at least 6 wt. %, at least 7 wt. %, at least 9 wt. %, at least 11 wt. %, at least 13 wt. %, at least 16 wt. %, at least 19 wt. %, at least 22 wt. %, at least 25 wt. %, at least 28 wt. %, at least 33 wt. %, at least 36 wt. %, at least 39 wt. %, at least 43 wt. %, at least 46 wt. %, at least 50 wt. %, at least 53 wt. %, at least 55 wt. %, at least 58 wt. %, or at least 60 wt. % for the total weight of the polymer blend. In a particular aspect, the content of the first polymer can be greater than 60 wt. % for the total weight of the polymer blend, such as at least 61 wt. %, at least 63 wt. %, at least 64 wt. %, at least 65 wt. %, at least 66 wt. %, at least 69 wt. %, at least 70 wt. %, at least 71 wt. %, at least 73 wt. %, at least 75 wt. %, at least 78 wt. %, at least 79 wt. %, at least 80 wt. %, at least 82 wt. %, at least 85 wt. %, at least 88 wt. %, at least 90 wt. %, at least 92 wt. %, at least 93 wt. %, at least 95 wt. %, or at least 97 wt. % for the total weight of the polymer blend.

In another aspect, the adhesive layer can include the first polymer in a content of at most 99 wt. % for the total weight of the polymer blend, at most 97 wt. %, at most 93 wt. %, at most 90 wt. %, at most 88 wt. %, at most 84 wt. %, at most 81 wt. %, at most 78 wt. %, at most 75 wt. %, at most 72 wt. %, at most 70 wt. %, at most 78 wt. %, at most 75 wt. %, at most 72 wt. %, at most 70 wt. %, at most 66 wt. %, at most 65 wt. %, at most 63 wt. %, at most 60 wt. %, at most 58 wt. %, at most 54 wt. %, at most 52 wt. %, at most 50 wt. %, at most 48 wt. %, at most 45 wt. %, at most 42 wt. %, at most 40 wt. %, at most 37 wt. %, at most 35 wt. %, at most 32 wt. %, at most 30 wt. %, at most 28 wt. %, at most 26 wt. %, at most 24 wt. %, or at most 21 wt. % for the total weight of the polymer blend. Moreover, the adhesive layer can include the first polymer in the content in a range including any of the minimum and maximum values noted herein. For example, the content of the first polymer can be in a range of 5 wt. % to 99 wt. % for the total weight of the polymer blend. In a particular example, the adhesive layer can include the first polymer in the content in a range of greater than 60 wt. % to 99 wt. % for the total weight of the polymer blend, such as in a range from 61 wt. % to 99 wt. %, in a range from 70 wt. % to 97 wt. %, or in a range from 80 wt. % to 95 wt. %.

In an embodiment, the first polymer can have a certain melting temperature that can facilitate improved formation and property of the adhesive layer. For instance, the melting temperature of the first polymer can be at least 190° C., at least 200° C., at least 210° C., or at least 220° C. In another instance, the first polymer can have a melting temperature at most 300° C., such as at most 290° C., at most 280° C., or at most 270° C. It is to be understood the melting temperature of the first polymer can be in a range including any of the minimum and maximum values disclosed herein. For example, the melting temperature of the first polymer can be in a range of 190 to 300° C., such as in a range of 220° C. to 270° C.

In a further embodiment, the first polymer can have a melt flow rate of at least 3 g/10 min, at least 5 g/10 min, or at least 8 g/10 min as measured according to ASTM D-1238. In a further embodiment, the melt flow rate of the first polymer may be at most 25 g/10 min, at most 22 g/10 min, or at most 20 g/10 min as measured according to ASTM D-1238. It can be appreciated that the melt flow rate can be in a range of any of the minimum and maximum values provided herein. For example, the melt flow rate can be in a range of 3 g/10 min to 25 g/10 min, in a range of 5 g/10 min to 22 g/10 min, or in a range of 8 to 20 g/10 min as measured according to ASTM D-1238.

In an embodiment, the adhesive layer can include a polymer blend of the first polymer and a second polymer, wherein the second polymer is a non-fluorinated polymer. In an aspect, the second polymer can include a sulfone group, an ether group, an aromatic ring, or any combination thereof. In another aspect, the second polymer can include a polyether, an aromatic polyester, aromatic and linear polyamides, or a combination thereof. For example, the second polymer can include polyphenylene ether (PPE), a polyether ether ketone (PEEK), a polyaryletherketones (PAEK), a polyether ketone (PEK), polyimide (PI), a polyamidimide (PAI), thermoplastic polyimide (PI), polyetherimide (PEI), polyethersulfone (PES), polyphenylene sulfide (PPS), polyphenylsulfone (PPSU), polyphthalamide (PPA), polyketone (PK), polyethylene terephthalate (PET), polybutylene terephthalate (PBT), or a combination thereof. In a particular example, the second polymer can include a polyethersulfone (PES). In a more particular instance, the second polymer can consist essentially of a polyethersulfone (PES).

In an embodiment, the adhesive layer can include the second polymer in a certain content that can facilitate improved formation and/or properties of the adhesive layer. For instance, the adhesive layer can include the second polymer in the content of at least 1 wt. % for a total weight of the polymer blend, such as at least 2 wt. %, at least 5 wt. %, at least 7 wt. %, at least 9 wt. %, at least 11 wt. %, at least 13 wt. %, at least 16 wt. %, at least 19 wt. %, at least 22 wt. %, at least 25 wt. %, at least 28 wt. %, at least 33 wt. %, at least 36 wt. %, at least 39 wt. %, at least 43 wt. %, or at least 46 wt. % for the total weight of the polymer blend. In another instance, the content of the second polymer may be at most 95 wt. % for a total weight of the polymer blend, such as at most 93 wt. %, at most 90 wt. %, at most 88 wt. %, at most 84 wt. %, at most 81 wt. %, at most 78 wt. %, at most 75 wt. %, at most 72 wt. %, at most 70 wt. %, at most 78 wt. %, at most 75 wt. %, at most 72 wt. %, at most 70 wt. %, at most 66 wt. %, at most 63 wt. %, at most 60 wt. %, at most 58 wt. %, at most 54 wt. %, at most 52 wt. %, at most 50 wt. %, at most 48 wt. %, at most 45 wt. %, at most 42 wt. %, at most 40 wt. %, at most 39 wt %, at most 37 wt. %, at most 35 wt. %, at most 32 wt. %, at most 30 wt. %, at most 28 wt. %, at most 26 wt. %, at most 24 wt. %, at most 21 wt. %, at most 18 wt. %, at most 15 wt. %, at most 12 wt. %, at most 10 wt. %, at most 8 wt. %, at most 7 wt. %, at most 5 wt. %, or at most 3 wt. % for the total weight of the polymer blend. In a particular aspect, the adhesive layer can include a content of the second polymer of less than 50 wt. %, such as less than 40 wt. %. Moreover, the adhesive layer can include a content of the second polymer in a range including any of the minimum and maximum percentages disclosed herein. For example, the content of the second polymer can be in a range of 1 wt. % to less than 50 wt. % or in a range of 5 wt. % to less than 40 wt. %. In a particular example, the adhesive layer can include a content of the second polymer in a range of 5 wt. % to 20 wt. %.

In an embodiment, the adhesive layer can include a certain ratio $C_1/C_2$ of the content of the first polymer $C_1$ to the content of the second polymer $C_2$ that can facilitate improved formation and/or properties of the adhesive layer. In an aspect, the ratio $C_1/C_2$ can be at least 5:95, at least 10:90, at least 15:85, at least 20:80, at least 25:75, at least 35:65, at least 50:50, at least 55:45, or at least 60:40. In a particular aspect, the ratio $C_1/C_2$ can be greater than 60:40, such as at least 63:37 or at least 65:35 or at least 67:33 or at least 70:30 or at least 73:27 or at least 75:25 or at least 78:22 or at least 80:20 or at least 83:17 or at least 85:15 or at least 87:13 or at least 89:11 or at least 90:10 or at least 93:7 or at least 95:5. In another aspect, the ratio $C_1/C_2$ can be at most 99:1, at most 95:5, at most 90:10, at most 88:12, at most 85:15, at most 83:17, at most 80:20, at most 77:23, at most 75:25, at most 72:28, at most 70:30, at most 68:32, at most 65:35, at most 60:40, at most 55:45, at most 50:50, at most 46:54, at most 44:56, at most 41:59, at most 38:62, at most 34:66, or at most 30:70. In a further aspect, the ratio $C_1/C_2$ can be in a range including any of the minimum and maximum values noted herein. For example, the ratio $C_1/C_2$ can be in a range greater than 60:40 to 99:1, or in a range from 65:35 to 97:3. In a particular example, the ratio $C_1/C_2$ can be in a range from 80:30 to 95:5.

In an embodiment, the second polymer can have a melting temperature that can facilitate improved formation and property of the adhesive layer. For instance, the melting temperature of the second polymer can be at least 135° C., such as at least 150° C., or at least 170° C. In another embodiment, the second polymer can have a melting temperature at most 350° C., such as at most 315° C., at most 300° C., or at most 280° C. It is to be understood the melting temperature of the second polymer can be in a range including any of the minimum and maximum values disclosed herein.

In another embodiment, the second polymer can have a glass transition temperature that can facilitate improved formation and property of the adhesive layer. For instance, the glass transition temperature of the second polymer can be at least 140, such as at least 150, at least 160, at least 170° C., or at least 190° C. In another instance, the second polymer can have a glass transition temperature of at most 315° C., such as at most 300° C. or at most 280° C. It is to be understood the glass transition temperature of the second polymer can be in a range including any of the minimum and maximum values disclosed herein. For example, the glass transition temperature of the second polymer can be in a range of 140 to 315° C., for instance, in a range of 170 to 315° C., or in a range of 190° C. to 300° C.

In an embodiment, the second polymer can have a melt flow rate that can facilitate improved formation and property of the adhesive layer. For instance, the melt flow rate of the second polymer can be at least 0.5 g/10 min, at least 1 g/10 min, or at least 3 g/10 min as measured according to ASTM D-1238. In a further example, the second polymer can have a melt flow rate of at most 25 g/10 min 20 g/10 min, at most 18 g/10 min, or at most 15 g/10 min as measured according to ASTM D-1238. It can be appreciated that the second polymer can have a melt flow rate in a range of any of the minimum and maximum values provided herein. For example, the melt flow rate of the second polymer can be in a range from 0.5 g/10 min to 25 g/10 min, in a range from 1 g/10 min to 18 g/10 min, or in a range from 3 to 15 g/10 min as measured according to ASTM D-1238.

In another embodiment, the adhesive layer can include a polymer blend of a modified fluoropolymer and a non-fluorinated polymer. In a particular embodiment, the adhesive layer can consist essentially of the polymer blend of a modified fluoropolymer and a non-fluorinated polymer. In a more particular embodiment, the adhesive layer can consist essentially of a modified fluoropolymer and a non-fluorinated polymer, wherein the modified fluoropolymer can be selected from modified perfluoroalkoxyethylene (mPFA), modified tetrafluoro-ethylene-perfluoro(methyl vinyl either) (mMFA), modified ethylene chlorotrifluoroethylene copolymer (mECTFE), modified tetrafluoroethylene-hexafluoropropylene (mFEP), and modified polyvinylidene fluoride (mPVDF), and the non-fluorinated polymer can be selected from polyphenylene ether (PPE), a polyether ether ketone (PEEK), a polyaryletherketones (PAEK), a polyether ketone (PEK), polyimide (PI), a polyamidimide (PAI), thermoplastic polyimide (PI), polyetherimide (PEI), polyethersulfone (PES), polyphenylene sulfide (PPS), polyphenylsulfone (PPSU), polyphthalamide (PPA), polyketone (PK), polyethylene terephthalate (PET), polybutylene terephthalate (PBT), or a combination thereof. In an even more particular embodiment, the adhesive layer can consist essentially of modified ethylene tetrafluoroethylene (mETFE) and polyethersulfone (PES). In another even more particular embodiment, the adhesive layer can consist essentially of modified perfluoroalkoxyethylene (mPFA) and polyethersulfone (PES).

The first polymer and the second polymer can be blended in contents described in embodiments herein. In some implementations, a twin screw compounder can be used to blend the first and second polymers and form a uniform dispersion. In some implementations, extrusion may be performed to form the adhesive layer from the blend. For example, the blend may be cut into pellets and extruded by using a single screw extruder. In an embodiment, the adhesive layer can include a continuous phase of the first polymer with the second polymer dispersed within the continuous phase. In an aspect, the adhesive layer can include domains of the second polymer dispersed within the first polymer phase, and in a particular aspect, the domains of the second polymer can be uniformly dispersed in the phase of the first polymer. Referring to FIG. 1, a scanning electron microscope image of a portion of the adhesive layer is illustrated. The adhesive layer 100 includes a continuous phase 101 of the first polymer and domains 102 of the second polymer dispersed within the continuous phase 101.

In another aspect, the domains of the second polymer can include a certain domain size that can facilitate improved formation and properties of the adhesive layer. For instance, the domains of the second polymer can have an average domain size less than 10 microns, such as at most 9 microns, at most 8 microns, at most 6 microns, at most 5 microns, at most 4 microns, or at most 3 microns. In another instance, the domains of the second polymer can have an average domain size of at least 0.4 microns, at least 0.6 microns, at least 0.8 microns, at least 1 micron, at least 1.5 microns, or at least 2 microns. It is to be appreciated that the domains of the second polymer can have an average domain size in a range including any of the minimum and maximum values disclosed herein, such as in a range of 0.4 microns to less than 10 microns or in a range of 0.6 microns to 6 microns.

In an embodiment, the polymer blend can have a particular complex viscosity. For instance, complex viscosity can be tuned to be suitable for a lamination process such that oozing problems may be prevented. In a further embodiment, the first polymer and the second polymer can be selected to have a particular melt flow rate for obtaining a desirable complex viscosity. In another embodiment, adjusting the weight content of at least one of the first polymer and the second polymer can facilitate formation of the blend having a desired complex viscosity.

The complex viscosity of the polymer blend is measured using an ARES rotational rheometer (TA Instruments) with a 25 mm parallel plate fixture. Temperature ramp is performed from 280° C. to 310° C. at 1 Hz and at a strain rate of 25%.

In an embodiment, the polymer blend can have a complex viscosity of at least $8.5 \times 10^3$ Pa·s as measured at 300° C. and 1 rad/s. For instance, the complex viscosity can be at least $1.0 \times 10^3$ Pa·s, at least $1.5 \times 10^3$ Pa·s, at least $2.5 \times 10^3$ Pa·s, at least $3. \times 10^3$ Pa·s, at least $4.2 \times 10^3$ Pa·s, at least $4.6 \times 10^3$ Pa·s, at least $5.0 \times 10^3$ Pa·s, as measured at 300° C. and 1 rad/s. In another instance, the complex viscosity may not be greater than $19.8 \times 10^3$ Pa·s as measured at 300° C. and 1 rad/s, such as at most $19.3 \times 10^3$ Pa·s, at most $18.8 \times 10^3$ Pa·s, at most $18.2 \times 10^3$ Pa·s, at most $17.8 \times 10^3$ Pa·s, or at most $17.5 \times 10^3$ Pa·s as measured at 300° C. and 1 rad/s. It is to be understood that the complex viscosity of the polymer blend can be in a range including any of the minimum and maximum values disclosed herein. For example, the complex viscosity of the polymer blend can be in a range of $3.5 \times 10^3$ Pa·s to $19.8 \times 10^3$ Pa·s, such as in a range of $9.2 \times 10^3$ Pa·s to $18.2 \times 10^3$ Pa·s or in a range of $10.2 \times 10^3$ Pa·s to $17.8 \times 10^3$ Pa·s as measured at 300° C. and 1 rad/s.

In an embodiment, the melting temperature of the polymer blend can be higher than that of the first polymer. For instance, the melting temperature of the polymer blend can be at least 10° C. higher, such as at least 15° C., or at least 20° C. higher than that of the first polymer. In another example, the melting temperature of the polymer blend can be at most 40° C. higher than that of the first polymer, such as at most 30° C. higher, at most 25° C. higher, or at most 20° C. higher than that of the first polymer. In another instance, the melting temperature of the polymer blend may be the same as the melting temperature of the first polymer. In still another instance, the melting temperature of the polymer blend may be less than the melting temperature of the first polymer. It is to be understood that the difference between the melting temperatures of the polymer blend and the first polymer can be in a range including any of the minimum and maximum values noted herein.

In an embodiment, the polymer blend can have a certain melting temperature that can facilitate improved formation and/or properties of the adhesive layer and bearing. For example, the melting temperature of the polymer blend can be at most 280° C., at most 270° C., or at most 265° C. In another embodiment, the melting temperature of the adhesive layer can be at least 245° C., such as at least 250° C. or at least 255° C. The melting temperature of the polymer blend can be in a range including any of the minimum and maximum values disclosed herein. In another embodiment, the melting temperature can be adjusted by changing the contents of the first and second polymers to suit different applications.

In an embodiment, the polymer blend can have a certain glass transition temperature (Tg) higher than the glass transition temperature of the second polymer. For instance, the glass transition temperature of the polymer blend can be at least 10° C. higher, at least 15° C. higher, or at least 20° C. higher than the glass transition temperature of the second polymer. In another instance, the glass transition temperature of the polymer blend can be at most 50° C. higher, at most 40° C. higher, or at most 30° C. higher than the glass transition temperature of the second polymer. It is to be understood that the difference between the glass transition temperatures of the polymer blend and the second polymer can be in a range including any of the minimum and maximum values noted herein.

In an embodiment, the polymer blend can have a certain glass transition temperature (Tg) that can facilitate improved formation and/or properties of the adhesive layer and bearing. For example, the polymer blend can have a glass transition temperature of at least 180° C., such as at least 190° C., or at least 200° C. In another instance, the polymer blend can have a glass transition temperature of at most 350° C., such as at most 340° C., or at most 330° C. It is to be understood the glass transition temperature of the polymer blend can be in a range including any of the minimum and maximum values disclosed herein. For example, the glass transition temperature of the polymer blend can be in a range of 180° C. to 350° C., or in a range of 190° C. to 330° C.

In an embodiment, the adhesive layer can have a particular peel strength. As disclosed herein, peel strength is measured by a T-peel test according to ASTM D1876-01 and tested on a five-layer laminate structure. The laminate structure includes in the order from bottom to top, a first zinc plated steel backing, a first layer of the adhesive layer, a sliding layer, a second layer of the adhesive layer, and a second zinc plated steel backing. Strips of the specimens of each layer having a width of 25 mm are placed on top of one another as disclosed herein and pressed using a lab scale press for 5 min at 315° C. In the T-peel test, the zinc plated steel backings are pulled apart using clamps and the peel force needed for detaching the zinc plated steel backings is measured using an Instron mechanical testing system (e.g., 3369 Dual Column Universal testing system). Sliding layers having different compositions can be used to perform the test.

In an aspect, the adhesive layer can have a peel strength of 75 N/in, at least 80 N/in, at least 85 N/in, at least 90 N/in, at least 95 N/in, at least 100 N/in, at least 105 N/in, at least 110 N/in, at least 115 N/in, at least 120 N/in, at least 125 N/in, at least 130 N/in, at least 135 N/in, at least 140 N/in, at least 145 N/in, at least 150 N/in, or at least 155 N/in. In another aspect, the adhesive layer can have a peel strength of at most 190 N/in, such as at most 185 N/in, at most 180 N/in, at most 175 N/in, at most 170 N/in, or at most 165 N/in. It is to be understood that peel strength of the adhesive layer may be in a range including any of the minimum and maximum values disclosed herein. For instance, the adhesive layer can have peel strength in a range of 75 N/in to 190 N/in. Peel strength as disclosed herein is to be understood as an average of the measurements of at least 3 five-layer laminate structures.

In an embodiment, the peel strength may be changed by adjusting thickness of the adhesive layer. For instance, increasing the thickness of the adhesive layer can increase the peel strength. In some applications, a thicker adhesive layer may be desired to provide a stronger bonding. In an embodiment, the thickness of the adhesive layer can be at least 5 microns, such as at least 8 microns, at least 10 microns, at least 12 microns, at least 15 microns, at least 18 microns, at least 20 microns, at least 22 microns, at least 25 microns, or at least 30 microns. In another embodiment, the thickness can be at most 100 microns, such as at most 95 microns, at most 93 microns, at most 90 microns, at most 85 microns, at most 80 microns, at most 75 microns, at most 70 microns, at most 65 microns, at most 60 microns, at most 55 microns, at most 50 microns, at most 48 microns, at most 43 microns, or at most 40 microns. It is to be understood that the thickness of the adhesive layer can be in a range including any of the minimum and maximum values disclosed herein. For example, the thickness of the adhesive layer can be in a range of 5 microns to 100 microns.

In a further embodiment, the adhesive layer can have a normalized peel strength. The normalized peel strength may be determined by dividing the peel strength by the thickness of the adhesive layer. For example, the adhesive layer noted in embodiments of this disclosure can have a normalized peel strength of at least 2 N/in/microns, such as at least 3 N/in/microns, at least 3 N/in/microns, or at least 4 N/in/microns. In another instance, the normalized peel strength of the adhesive layer can be at most 35 N/in/microns, such as at most 30 N/in/microns, at most 25 N/in/microns, at most 20 N/in/microns, at most 15 N/in/microns, at most 10 N/in/microns, at most 8 N/in/microns, or at most 6 N/in/microns. It is to be appreciated that normalized peel strength can be in a range including any of the minimum and maximum values disclosed herein. For example, the normalized peel strength can be in a range of 2 N/in/microns to 35 N/in/microns, in a range of 3 N/in/microns to 20 N/in/microns, or in a range of 4 N/in/microns to 8 N/in/microns.

In an embodiment, the adhesive layer can have an elongation at break along a longitudinal direction and an elongation at break along a transverse direction. As disclosed herein, the longitudinal direction can be the extrusion direction, and the transversal direction can be perpendicular to the longitudinal direction. The elongation at break along the longitudinal direction is calculated by formula $(L_{break}-L_o)/L_o \times 100\%$, where $L_{break}$ is the length at break of the adhesive layer, and Lo is the original length of the adhesive layer before being stretched along the longitudinal direction. The elongation at break along the transverse direction is calculated by formula $(W_{break}-W_o)/W_o \times 100\%$, where $W_{break}$ is the width at break of the adhesive layer, and $W_o$ is the original width of the adhesive layer before being stretched along the transverse direction. The elongations at break along the two directions may be different or similar. In a particular embodiment, the elongation at break along the longitudinal direction may not be less than that along the transverse direction. As used herein, the elongation at break is measured in accordance with ASTM-D638. The elongation at break is to be understood as an average of the measurements of at least 3 samples.

In an embodiment, the adhesive layer can have a desirable elongation at break along the longitudinal direction, transversal direction, or both. In an aspect, the elongation at break along the transverse direction of the adhesive layer can be at least 2%, at least 5%, at least 10%, at least 20%, at least 25%, at least 35%, at least 45%, at least 60%, at least 80%, at least 100%, at least 140%, at least 180%, or at least 200%. In a further aspect, the elongation at break along the transverse direction can be at most 200%, at most 180%, at most 150%, at most 100%, at most 80%, at most 50%, at most 30%, or at most 20%. It is to be understood that the elongation at break in the transverse direction can be in a range including any of the minimum and maximum percentages disclosed herein. For example, the elongation at break along the transverse direction can be in a range of 2% to 200%.

In another aspect, the elongation in the extrusion direction can be at least 65%, such as at least 75%, at least 85%, at least 90%, at least 100%, at least 120%, or at least 150%. In another aspect, the elongation at break along the longitudinal direction may at most 350%, at most 300%, at most 280%, or at most 230%. In this disclosure, the longitudinal direction and the extrusion direction are used interchangeably. It is to be understood that the elongation at break along the longitudinal direction can be in a range including any of the minimum and maximum percentages disclosed herein. For example, the elongation at break along the longitudinal direction can be in a range of 65% to 350%.

In a further embodiment, the adhesive layer can have a ratio of the elongation at break along the longitudinal direction to the elongation at break along the transverse direction. For instance, the ratio can be at least 1, such as at least 1.5:1, or at least 2. In another instance, the ratio may be at most 15, such as at most 11, at most 7, at most 5, or at most 4. It is to be understood that the ratio of the elongation at break along the longitudinal direction to the elongation at break along the transverse direction can be in a range including any of the minimum and maximum ratios disclosed herein. For example, the ratio can be in a range of 1 to 15.

In an embodiment, the adhesive layer can have a tensile stress in the extrusion direction and the transversal direction. The tensile stress is measured in accordance with ASTM-D638. The tensile stress noted in this disclosure is to be understood as an average of the measurements of at least 3 samples. In an aspect, the adhesive layer can have a tensile stress in the extrusion direction of at least 25 MPa, such as at least 30 MPa, at least 33 MPa, at least 35 MPa, or at least 38 MPa. In another aspect, tensile stress in the extrusion direction can be at most 70 MPa, at most 65 MPa, at most 60 MPa, at most 55 MPa, at most 50 MPa, at most 45 MPa, or at most 40 MPa. Moreover, the tensile stress in the extrusion direction can be within a range including any of the minimum and maximum values noted herein. For instance, the tensile stress in the extrusion direction can be in the range from 25 MPa to 70 MPa, or in a range from 25 to 65 MPa or in the range from 30 MPa to 50 MPa.

In an aspect, the adhesive layer can have a tensile stress in the transversal direction of at least 10 MPa, such as at least 20 MPa, at least 22 MPa, or at least 25 MPa. In another aspect, tensile stress in the transversal direction can be at most 45 MPa, such as at most 42 MPa, at most 38 MPa, or at most 35 MPa. Moreover, the tensile stress in the transversal direction can be within a range including any of the minimum and maximum values noted herein. For instance, the tensile stress in the extrusion direction can be in the range from 10 MPa to 45 MPa or in the range from 10 MPa to 42 MPa.

In a particular embodiment, the adhesive layer can comprise a hot melt adhesive. At a temperature in a range of 250° C. to 400° C., such as in a range of 270° C. to 330° C. or in a range of 280° C. to 315° C., the adhesive layer can melt and form a bonding layer between the substrate layer and the sliding layer. In another application, the adhesive layer can be in direct contact with the substrate layer, the sliding layer, or both.

In an embodiment, a bearing can include the adhesive layer. In an exemplary application, the bearing can include a substrate layer, and the adhesive layer can be disposed over the substrate layer. In certain instances, the bearing can also include a sliding layer disposed over the adhesive layer. A particular example of the bearing can include a Norglide® bearing.

In an embodiment, the substrate layer can include metal. For example, the substrate layer can include an alloy. A particular example of metal can include iron, carbon, Ni, Zn, Co, Cr, Ti, Zr, Mo or any combination thereof. In a particular embodiment, the substrate layer can include aluminum, steel, stainless steel, cold-rolled steel, matt zinc plated steel, or any combination thereof. In a particular embodiment, the substrate can include zinc plated steel. In a more particular embodiment, the substrate can include zinc plated steel. In some applications, the adhesive layer noted in embodiments herein, can be particularly suitable for a substrate of zinc plated steel. In an even more particular embodiment, the bearing can include a substrate of zinc plated steel, a sliding layer, and the adhesive layer disposed between the substrate and the sliding layer including the polymer blend of mETFE and PES.

In an embodiment, the sliding layer can include a polymer, such as polytetrafluoroethylene, polyether ether ketone, polyetherketone, polyimide, polyamidimide, or any combination thereof. In another embodiment, the sliding layer can include a filler, an additive, such as a rheology modifier, tackifier, or the like, an inorganic material, a fiber, or any combination thereof. For instance, the sliding layer can include carbon, graphite, graphene, CNT, polyesters, glass fiber, aramid fiber, carbon fiber, boron nitride, an inorganic filler, or any combination thereof.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1

A bearing, comprising:
a substrate;
an adhesive layer overlying the substrate; and
a sliding layer overlying the adhesive layer,
wherein the adhesive layer comprises a polymer blend of a first polymer and a second polymer, wherein the first polymer comprises a modified fluoropolymer, and the second polymer comprises a non-fluorinated polymer.

Embodiment 2

A bearing, comprising:
a substrate;
an adhesive layer overlying and in contact with the substrate; and
a sliding layer overlying the adhesive layer,
wherein the adhesive layer comprises a polymer blend of a first polymer and a second polymer, wherein the second polymers is a non-fluorinated polymer.

Embodiment 3

A bearing, comprising:
a substrate;
an adhesive layer overlying the substrate; and
a sliding layer overlying the adhesive layer;
wherein the adhesive layer comprises a polymer blend of a first polymer and a second polymer, wherein the second polymer is a non-fluorinated polymer and has a content of less than 50 wt. % for a total weight of the polymer blend.

Embodiment 4

The bearing of embodiment 2 or 3, wherein the first polymer comprises a fluoropolymer.

Embodiment 5

The bearing of any one of embodiments 2 to 4, wherein the first polymer comprises a modified fluoropolymer.

Embodiment 6

The bearing of any one of embodiments 1 to 5, wherein the polymer blend comprises at least 5 wt. % of the first polymer for a total weight of the polymer blend, at least 6 wt. %, at least 7 wt. %, at least 9 wt. %, at least 11 wt. %, at least 13 wt. %, at least 16 wt. %, at least 19 wt. %, at least 22 wt. %, at least 25 wt. %, at least 28 wt. %, at least 33 wt. %, at least 36 wt. %, at least 39 wt. %, at least 43 wt. %, at least 46 wt. %, at least 50 wt. %, at least 53 wt. %, at least 55 wt. %, at least 58 wt. %, at least 61 wt. %, at least 64 wt. %, at least 66 wt. %, at least 70 wt. %, at least 73 wt. %, at least 75 wt. %, at least 78 wt. %, at least 80 wt. %, at least 82 wt. %, at least 85 wt. %, at least 88 wt. %, at least 90 wt. %, at least 92 wt. %, at least 95 wt. %, or at least 97 wt. % for the total weight of the polymer blend.

Embodiment 7

The bearing of any one of embodiments 1 to 6, wherein the polymer blend comprises greater than 60 wt. % of the first polymer for a total weight of the polymer blend, such as at least 61 wt. %, at least 63 wt. %, at least 65 wt. %, at least 69 wt. %, at least 71 wt. %, at least 73 wt. %, at least 75 wt. %, at least 79 wt. %, or at least 80 wt % of the first polymer for the total weight of the polymer blend.

Embodiment 8

The bearing of any one of embodiments 1 to 6, wherein the polymer blend comprises at most 99 wt. % of the first polymer for a total weight of the polymer blend, at most 97 wt. %, at most 93 wt. %, at most 90 wt. %, at most 88 wt. %, at most 84 wt. %, at most 81 wt. %, at most 78 wt. %, at most 75 wt. %, at most 72 wt. %, at most 70 wt. %, at most 78 wt. %, at most 75 wt. %, at most 72 wt. %, at most 70 wt. %, at most 66 wt. %, at most 63 wt. %, at most 60 wt. %, at most 58 wt. %, at most 54 wt. %, at most 52 wt. %, at most 50 wt. %, at most 48 wt. %, at most 45 wt. %, at most 42 wt. %, at most 40 wt. %, at most 37 wt. %, at most 35 wt. %, at most 32 wt. %, at most 30 wt. %, at most 28 wt. %, at most 26 wt. %, at most 24 wt. %, at most 21 wt. %, at most 18 wt. %, at most 15 wt. %, at most 12 wt. %, at most 10 wt. %, at most 8 wt. %, at most 7 wt. %, at most 5 wt. %, or at most 3 wt. % for the total weight of the polymer blend.

Embodiment 9

The bearing of any one of embodiments 1 to 8, wherein the polymer blend comprises at least 1 wt. % of the second polymer for a total weight of the polymer blend, at least 2 wt. %, at least 5 wt. %, at least 7 wt. %, at least 9 wt. %, at least 11 wt. %, at least 13 wt. %, at least 16 wt. %, at least 19 wt. %, at least 22 wt. %, at least 25 wt. %, at least 28 wt. %, at least 33 wt. %, at least 36 wt. %, at least 39 wt. %, at least 43 wt. %, or at least 46 wt. % for the total weight of the polymer blend.

Embodiment 10

The bearing of any one of embodiments 1 to 9, wherein the polymer blend comprises less than 50 wt. % of the second polymer for a total weight of the polymer blend, at most 48 wt. %, at most 45 wt. %, at most 42 wt. %, at most 40 wt. %, at most 37 wt. %, at most 35 wt. %, at most 32 wt. %, at most 30 wt. %, at most 28 wt. %, at most 26 wt. %, at most 24 wt. %, at most 21 wt. %, at most 18 wt. %, at most 15 wt. %, at most 12 wt. %, at most 10 wt. %, at most 8 wt. %, at most 7 wt. %, at most 5 wt. %, or at most 3 wt. % for the total weight of the polymer blend.

Embodiment 11

The bearing of any one of embodiments 1 to 10, wherein the polymer blend comprises less than 40 wt. % of the second polymer for a total weight of the polymer blend, at most 39 wt. %, at most 37 wt. %, at most 35 wt. %, at most 32 wt. %, at most 30 wt. %, at most 28 wt. %, at most 26 wt. %, at most 24 wt. %, at most 21 wt. %, at most 18 wt. %, at most 15 wt. %, at most 12 wt. %, at most 10 wt. %, at most 8 wt. %, at most 7 wt. %, or at most 5 wt of the second polymer for the total weight of the polymer blend.

Embodiment 12

The bearing of any one of embodiments 1 to 11, wherein a ratio of the first polymer to the second polymer is greater than 60:40 or at least 63:37 or at least 65:35 or at least 67:33 or at least 70:30 or at least 73:27 or at least 75:25 or at least 78:22 or at least 80:20 or at least 83:17 or at least 85:15 or at least 87:13 or at least 89:11 or at least 90:10 or at least 93:7 or at least 95:5 or at least 97:3.

Embodiment 13

The bearing of any one of embodiments 1 to 12, wherein a ratio of the first polymer to the second polymer is at most 99:1, at most 97:3, at most 95:5, at most 91:9, at most 88:12, at most 85:15, at most 83:17, at most 80:20, at most 77:23, at most 75:25, at most 72:28, at most 70:30, at most 68:32, at most 65:35, or at most 61:39.

Embodiment 14

The bearing of any one of embodiments 1 to 13, wherein the first polymer comprises a functional group comprising a hydroxyl group (—OH), a carbonyl fluoride (—COF), a carboxyl group (—COOH), an anhydride group, an acrylate group (—CH$_2$=CHCOOH), a glycidyl methacrylate group (—CH$_2$C(CH$_3$) COOCH$_2$(CHCH$_2$O)), or a combination thereof.

Embodiment 15

The bearing of any one of embodiments 1 to 14, wherein the first polymer comprises modified ethylene tetrafluoroethylene (mETFE), modified perfluoroalkoxyethylene (mPFA), modified tetrafluoro-ethylene-perfluoro(methyl vinyl either) (mMFA), modified ethylene chlorotrifluoroethylene copolymer (mECTFE), modified tetrafluoroethylene-hexafluoropropylene (mFEP), modified polyvinylidene fluoride (mPVDF), or a combination thereof.

Embodiment 16

The bearing of any one of embodiments 1 to 15, wherein the first polymer comprises modified ethylene tetrafluoroethylene (mETFE).

Embodiment 17

The bearing of any one of embodiments 1 to 16, wherein the first polymer consists essentially of modified ethylene tetrafluoroethylene (mETFE).

Embodiment 18

The bearing of embodiment 16 or 17, wherein the modified ethylene tetrafluoroethylene (mETFE) comprises a functional group including an anhydride group.

Embodiment 19

The bearing of any one of embodiments 1 to 18, wherein the second polymer comprises a polyether, an aromatic polyester, aromatic and linear polyamides, or a combination thereof.

Embodiment 20

The bearing of any one of embodiments 1 to 19, wherein the second polymer comprises polyphenylene ether (PPE), a polyether ether ketone (PEEK), a polyaryletherketones (PAEK), a polyether ketone (PEK), polyimide (PI), a polyamidimide (PAI), thermoplastic polyimide (PI), polyetherimide (PEI), polyethersulfone (PES), polyphenylene sulfide (PPS), polyphenylsulfone (PPSU), polyphthalamide (PPA), polyketone (PK), polyethylene terephthalate (PET), polybutylene terephthalate (PBT), or a combination thereof.

Embodiment 21

The bearing of any one of embodiments 1 to 20, wherein the second polymer comprises a polyethersulfone (PES).

Embodiment 22

The bearing of any one of embodiments 1 to 21, wherein the second polymer consists essentially of a polyethersulfone (PES).

Embodiment 23

The bearing of any one of embodiments 1 to 22, wherein the adhesive layer comprises a polymer blend of modified ethylene tetrafluoroethylene (mETFE) and polyethersulfone (PES).

Embodiment 24

The bearing of any one of embodiments 1 to 23, wherein the adhesive layer consists essentially of modified ethylene tetrafluoroethylene (mETFE) and polyethersulfone (PES).

Embodiment 25

The bearing of any one of embodiments 1 to 24, wherein the polymer blend comprises a melting temperature that is at least 10° C. higher than a melting temperature of the first polymer, at least 15° C., or at least 20° C. higher than the melting temperature of the first polymer.

Embodiment 26

The bearing of any one of embodiments 1 to 24, wherein the polymer blend comprises a melting temperature that is same as or less than a melting temperature of the first polymer.

Embodiment 27

The bearing of any one of embodiments 1 to 26, wherein the adhesive layer has a peel strength of at least 75 N/in, at least 80 N/in, at least 85 N/in, at least 90 N/in, at least 95 N/in, at least 100 N/in, at least 105 N/in, at least 110 N/in, at least 115 N/in, at least 120 N/in, at least 125 N/in, at least 130 N/in, at least 135 N/in, at least 140 N/in, at least 145 N/in, at least 150 N/in, or at least 155 N/in.

Embodiment 28

The bearing of any one of embodiments 1 to 27, wherein the adhesive layer has a peel strength of at most 190 N/in, such as at most 185 N/in, at most 180 N/in, at most 175 N/in, at most 170 N/in, or at most 165 N/in.

Embodiment 29

The bearing of any one of embodiments 1 to 28, wherein the adhesive layer has a thickness in a range of 5 microns to 100 microns.

Embodiment 30

The bearing of any one of embodiments 1 to 29, wherein the substrate comprises metal, and wherein the adhesive layer is in contact with the substrate.

Embodiment 31

The bearing of any one of embodiments 1 to 30, wherein the substrate comprises aluminum, steel, stainless steel, cold-rolled steel, zinc plated steel, or any combination thereof.

Embodiment 32

The bearing of any one of embodiments 1 to 31, wherein the substrate comprises zinc plated steel.

Embodiment 33

The bearing of any one of embodiments 1 to 32, wherein the sliding layer comprises polytetrafluoroethylene, polyether ether ketone, polyetherketone, polyimide, polyamidimide, and any combination thereof.

Embodiment 34

The bearing of any one of embodiments 1 to 33, wherein the sliding layer comprises a filler, an additive, an inorganic material, a fiber, or a combination thereof.

Embodiment 35

The bearing of any one of embodiments 1 to 34, wherein the adhesive layer comprises a continuous phase including the first polymer and domains dispersed within the first continuous phase, wherein the domains comprise the second polymer and an average size of at most 9 microns, at most 8 microns, at most 6 microns, at most 5 microns, at most 4 microns, or at most 3 microns.

Embodiment 36

The bearing of any one of embodiments 1 to 35, wherein the polymer blend comprises a continuous phase including the first polymer and domains dispersed within the first continuous phase, wherein the domains comprise the second polymer and an average size of at least 0.4 microns, at least 0.6 microns, at least 0.8 microns, at least 1 micron, at least 1.5 microns, or at least 2 microns.

EXAMPLES

Example 1

Polymer blend was prepared having the compositions included in Table 1. ETFE polymers are obtained from Daikin under the commercial line NEOFLON™ and PES from Solvay S.A. or BASF. Modified ETFE are from Asahi or Chemours. A twin-screw compounder was used to blend the polymers. Average domain sizes of PES were measured as noted in embodiments herein and included in Table 1. Sample CS1 had bigger average domain sizes compared to S2.

TABLE 1

| Sample | Composition | Average PES Domain size |
|---|---|---|
| CS1 | 85.5 wt. % ETFE 9.5 wt. % PES 5 wt. % modified ETFE | About 10 microns |
| S2 | 80 wt. % modified ETFE 20 wt. % PES | About 3 microns |

Example 2

Adhesive layer samples were prepared having the compositions included in Table 2 below. Modified ETFE was purchased from Chemours. PES was purchased from Solvay S.A. or BASF. Blends of samples S4 to S8 were formed using a twin-screw compounder at 380° C. and then cut into small pellets. The pellets of all the samples were extruded into films of 30 μm thick using a single screw extruder. 2 to 3 films of each composition were subjected to the T-peel tests for measuring peel strength. Each film was tested in a 5-layer laminate structure prepared as disclosed in embodiments herein. The sliding layers were formed with PTFE including carbon and graphite filler. Lamination was performed at 0.5 MPa and 315° C. for 5 minutes to allow bonding between the layers. The T-peel tests were conducted according to ASTM D1876-01.

Figure 2:
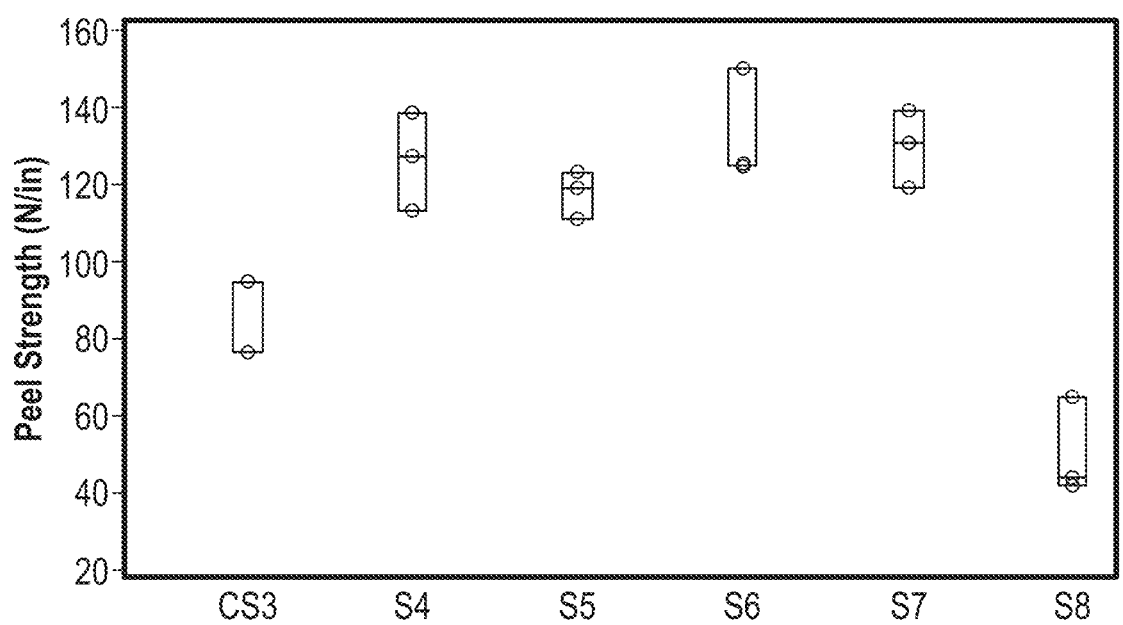
FIG. 2 includes an illustration of peel strength of samples of adhesive layers.

The test results are illustrated in FIG. 2. Samples S4 to S7 demonstrated peel strength of approximately 125 N/in, 120 N/in, 135 N/in, and 130 N/in, respectively, significantly higher than peel strength of approximately 85 N/in of sample CS3. Sample S8 had peel strength of 55 N/in. Samples S6 and S7 further demonstrated the cohesive failure mode.

TABLE 2

| Adhesive Layer Samples | Composition |
|---|---|
| CS3 | 100 wt. % modified ETFE |
| S4 | 95 wt. % modified ETFE 5 wt. % PES |
| S5 | 90 wt. % modified ETFE 10 wt. % PES |
| S6 | 85 wt. % modified ETFE 15 wt. % PES |
| S7 | 80 wt. % modified ETFE 20 wt. % PES |
| S8 | 60 wt. % modified ETFE 40 wt. % PES |

Example 3

Figure 3:
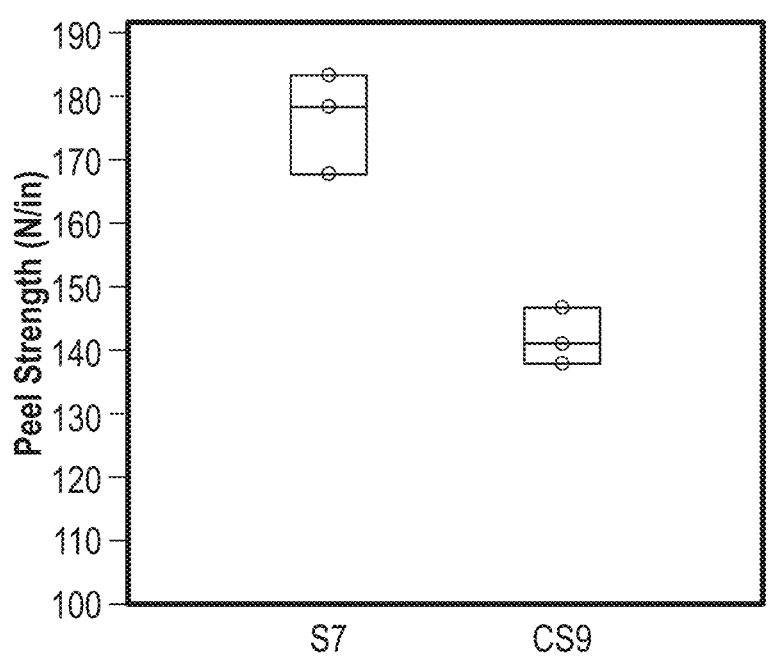
FIG. 3 includes an illustration of peel strength for different adhesive layer samples.

Adhesive layer samples having compositions included in Table 3 were formed in the same manner as described in Example 2. All the adhesive layers had the same thickness of 30 microns and were subjected to the T-peel tests for measuring peel strength. Each layer was tested in a 5-layer laminate structure prepared as disclosed in embodiments herein. The sliding layers were formed with PTFE including carbon and graphite filler. Lamination was performed at 0.5 MPa and 315° C. for 5 minutes to allow bonding between the layers. The T-peel tests were conducted according to ASTM D1876-01. The test results are illustrated in FIG. 3. Adhesive layer sample S7 demonstrated peel strength of approximately 180 N/in, significantly higher than peel strength of approximately 142 N/in of CS9.

TABLE 3

| Adhesive Layer Samples | Composition |
|---|---|
| S7 | 80 wt. % modified ETFE |
|  | 20 wt. % PES |
| CS9 | 85.5 wt. % ETFE |
|  | 9.5 wt. % PES |
|  | 5 wt. % modified ETFE |

Embodiments disclosed herein represent a departure from the state of the art. The adhesively layer of embodiments herein can include a blend of a first polymer, such as a fluoropolymer, and a second polymer, such as a non-fluorinated polymer. Particularly, first and second polymers can be present in certain contents and/or at ratios relative to each other. The adhesive layer described in embodiments herein demonstrates significantly improved properties, such as peel strength, over adhesive layers formed with the first polymer. The combination of the types of the first and second polymers, the contents thereof, or any combination thereof can contribute to the improved properties of the adhesive layer.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A bearing, comprising:
a substrate;
an adhesive layer overlying the substrate; and
a sliding layer overlying the adhesive layer,
wherein the adhesive layer comprises a polymer blend, wherein the polymer blend consists of a modified fluoropolymer and a non-fluorinated polymer, wherein the modified fluoropolymer is a first polymer, and the non-fluorinated polymer is a second polymer, wherein a ratio of a weight content of the first polymer to a weight content of the second polymer is greater than 60:40 and at most 99:1; and
wherein:
the first polymer is selected from the group consisting of modified ethylene tetrafluoroethylene (mETFE), modified perfluoroalkoxyethylene (mPFA), modified tetrafluoro-ethylene-perfluoro(methyl vinyl either) (mMFA), modified ethylene chlorotrifluoroethylene copolymer (mECTFE), modified tetrafluoroethylene-hexafluoropropylene (mFEP), and modified polyvinylidene fluoride (mPVDF); and
the second polymer comprises a polyether, and aromatic polyester, aromatic and linear polyamides, or a combination thereof.

2. The bearing of claim 1, wherein the polymer blend comprises at least 65 wt. % and at most 99 wt. % of the first polymer for a total weight of the polymer blend.

3. The bearing of claim 1, wherein a ratio of a weight content of the first polymer to a weight content of the second polymer is at least 70:30 and at most 95:1.

4. The bearing of claim 3, wherein the first polymer comprises modified ethylene tetrafluoroethylene (mETFE).

5. The bearing of claim 4, wherein the modified ethylene tetrafluoroethylene (mETFE) comprises a functional group including an anhydride group.

6. The bearing of claim 1, wherein the first polymer comprises a functional group comprising a hydroxyl group (—OH), a carbonyl fluoride (—COF), a carboxyl group (—COOH), an anhydride group, an acrylate group (—CH2=CHCOOH), a glycidyl methacrylate group (—CH2C(CH3)COOCH2(CHCH2O)), or a combination thereof.

7. The bearing of claim 1, wherein the first polymer comprises modified ethylene tetrafluoroethylene (mETFE).

8. The bearing of claim 1, wherein the second polymer is selected from the group consisting of polyphenylene ether (PPE), a polyether ether ketone (PEEK), a polyaryletherketones (PAEK), a polyether ketone (PEK), polyimide (PI), a polyamidimide (PAI), thermoplastic polyimide (PI), polyetherimide (PEI), polyethersulfone (PES), polyphenylene sulfide (PPS), polyphenylsulfone (PPSU), polyphthalamide (PPA), polyketone (PK), polyethylene terephthalate (PET), polybutylene terephthalate (PBT), or a combination thereof.

9. The bearing of claim 1, wherein the adhesive layer has a peel strength of at least 90 N/in.

10. A bearing, comprising:
a substrate;
an adhesive layer overlying and in contact with the substrate; and
a sliding layer overlying the adhesive layer,
wherein the adhesive layer comprises a polymer blend, wherein the polymer blend consists of a first polymer and a second polymer, wherein the second polymers is a non-fluorinated polymer, and wherein the first polymer is selected from the group consisting of modified ethylene tetrafluoroethylene (mETFE), modified perfluoroalkoxyethylene (mPFA), modified tetrafluoroethylene-perfluoro(methyl vinyl either) (mMFA), modified ethylene chlorotrifluoroethylene copolymer (mECTFE), modified tetrafluoroethylene-hexafluoropropylene (mFEP), and modified polyvinylidene fluoride (mPVDF); and wherein the second polymer is selected from the group consisting of polyphenylene ether (PPE), a polyether ether ketone (PEEK), a polyaryletherketones (PAEK), a polyether ketone (PEK), polyimide (PI), a polyamidimide (PAI), thermoplastic polyimide (PI), polyetherimide (PEI), polyethersulfone (PES), polyphenylene sulfide (PPS), polyphenylsulfone (PPSU), polyphthalamide (PPA), polyketone (PK), polyethylene terephthalate (PET), polybutylene terephthalate (PBT), or a combination thereof,
wherein the polymer blend comprises at least 75 wt. % of the first polymer for a total weight of the polymer blend.

11. The bearing of claim 10, wherein the first polymer comprises modified ethylene tetrafluoroethylene (mETFE).

12. The bearing of claim 11, wherein the modified ethylene tetrafluoroethylene (mETFE) comprises a functional group including an anhydride group.

13. The bearing of claim 11, wherein the second polymer comprises polyethersulfone (PES).

14. The bearing of claim 13, wherein the polymer blend comprises a ration of a weight content of the first polymer to a weight content of the second polymer is at least 75:25 and at most 95:5.

15. The bearing of claim 10, wherein the polymer blend comprises a ratio of a weight content of the first polymer to a weight content of the second polymer is at least 75:22 and at most 95:5.

16. The bearing of claim 10, wherein the polymer blend comprises at least 80 wt. % and at most 99 wt. % of the first polymer for the total weight of the polymer blend.

17. A bearing, comprising:
a substrate;
an adhesive layer overlying the substrate; and
a sliding layer overlying the adhesive layer;
wherein the adhesive layer comprises a polymer blend, wherein the polymer blend consists of a first polymer and a second polymer, wherein the first polymer is a modified fluoropolymer and comprise modified ethylene tetrafluoroethylene (mETFE), and the second polymer is a non-fluorinated polymer comprising polyethersulfone (PES) and has a content of not greater than 25 wt. % for a total weight of the polymer blend.

18. The bearing of claim 17, wherein the first polymer comprises a functional group comprising a hydroxyl group (—OH), a carbonyl fluoride (—COF), a carboxyl group (—COOH), an anhydride group, an acrylate group (—CH2=CHCOOH), a glycidyl methacrylate group (—CH2C(CH3)COOCH2(CHCH2O)), or a combination thereof.

19. The bearing of claim 17, wherein the polymer blend comprises at least 80 wt. % and at most 99 wt. % of the first polymer for the total weight of the polymer blend.

20. The bearing of claim 18, wherein the polymer blend comprises greater than 80 wt. % of the first polymer for a total weight of the polymer blend.

\* \* \* \* \*

UNITED STATES PATENT AND TRADEMARK OFFICE
CERTIFICATE OF CORRECTION

| | |
|---|---|
| PATENT NO. | : 11,976,688 B2 |
| APPLICATION NO. | : 16/875374 |
| DATED | : May 7, 2024 |
| INVENTOR(S) | : Dongyeop Shin |

Page 1 of 1

It is certified that error appears in the above-identified patent and that said Letters Patent is hereby corrected as shown below:

In the Claims

In Column 18, Claim 1, Line 13, please delete "and aromatic" and insert --an aromatic--

In Column 18, Claim 3, Line 21, please delete "95:1" and insert --95:5--

In Column 19, Claim 14, Line 18, please delete "a ration" and insert --a ratio--

In Column 19, Claim 15, Line 23, please delete "75:22" and insert --78:22--

Signed and Sealed this
Nineteenth Day of August, 2025

Coke Morgan Stewart
*Acting Director of the United States Patent and Trademark Office*